United States Patent
Uchise et al.

(10) Patent No.: US 11,271,448 B2
(45) Date of Patent: Mar. 8, 2022

(54) STATOR, MOTOR, AND METHOD OF MANUFACTURING STATOR

(71) Applicant: Nidec Corporation, Kyoto (JP)

(72) Inventors: Hideaki Uchise, Kyoto (JP); Takayuki Migita, Kyoto (JP); Hiroshi Kitagaki, Kyoto (JP); Tatsuya Ito, Kyoto (JP); Akihiro Okita, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 255 days.

(21) Appl. No.: 16/621,713

(22) PCT Filed: Jun. 25, 2018

(86) PCT No.: PCT/JP2018/023987
§ 371 (c)(1),
(2) Date: Dec. 12, 2019

(87) PCT Pub. No.: WO2019/004116
PCT Pub. Date: Jan. 3, 2019

(65) Prior Publication Data
US 2021/0143702 A1     May 13, 2021

Related U.S. Application Data

(60) Provisional application No. 62/526,499, filed on Jun. 29, 2017.

(30) Foreign Application Priority Data

Jun. 20, 2018   (JP) ............................. JP2018-117037

(51) Int. Cl.
*H02K 3/52*    (2006.01)
*H02K 1/14*    (2006.01)
(Continued)

(52) U.S. Cl.
CPC ............. *H02K 3/522* (2013.01); *H02K 1/146* (2013.01); *H02K 3/325* (2013.01); *H02K 15/022* (2013.01);
(Continued)

(58) Field of Classification Search
CPC ........ H02K 3/522; H02K 1/146; H02K 3/325; H02K 15/022; H02K 15/095; H02K 15/10; H02K 2203/06
See application file for complete search history.

(56) References Cited

U.S. PATENT DOCUMENTS 4,752,707 A * 6/1988 Morrill .................... H02K 3/28
310/179
7,135,799 B2 * 11/2006 Rittmeyer ................ H02K 3/28
310/180
(Continued)

FOREIGN PATENT DOCUMENTS

EP    2 940 834 A2    11/2015
JP    11-69671 A      3/1999
(Continued)

OTHER PUBLICATIONS

Official Communication issued in International Patent Application No. PCT/JP2018/023987, dated Oct. 2, 2018.

*Primary Examiner* — Burton S Mullins
(74) *Attorney, Agent, or Firm* — Keating & Bennett

(57) ABSTRACT

A stator includes a stator core, an insulator attached to the stator core, and coil wires. The insulator includes base portions respectively surrounding outer peripheral surfaces of teeth and an outer wall portion located immediately above the core back and extending in a circumferential direction. Each of the coil wires includes coils into which each of the coil wires is wound around more than one of the teeth by concentrated winding, a connecting wire connecting the coils, and a pair of lead wires located at two ends of each of
(Continued)

the coil wires and extending from the coils. The connecting wire of each of the coil wires includes at least one outside-passing portion extending along an outer surface of the outer wall portion on a radially outer side of the outer wall portion.

9 Claims, 11 Drawing Sheets

(51) Int. Cl.
*H02K 15/02* (2006.01)
*H02K 3/32* (2006.01)
*H02K 15/095* (2006.01)
*H02K 15/10* (2006.01)

(52) U.S. Cl.
CPC .......... *H02K 15/095* (2013.01); *H02K 15/10* (2013.01); *H02K 2203/06* (2013.01)

(56) References Cited

U.S. PATENT DOCUMENTS

| | | | |
|---|---|---|---|
| 7,188,403 B2* | 3/2007 | Yamamoto | H02K 1/08 29/605 |
| 7,408,281 B2* | 8/2008 | Kinashi | H02K 21/16 310/180 |
| 8,350,436 B2* | 1/2013 | Sakane | H02K 3/522 310/194 |
| 9,077,225 B2* | 7/2015 | Chiba | H02K 15/095 |
| 2014/0145544 A1 | 5/2014 | Kodani et al. | |
| 2015/0311760 A1 | 10/2015 | Iwasaki | |

FOREIGN PATENT DOCUMENTS

| | | |
|---|---|---|
| JP | 2000-232748 A | 8/2000 |
| JP | 2002-247792 A | 8/2002 |
| JP | 2010-213527 A | 9/2010 |
| JP | 2010-259318 A | 11/2010 |
| JP | 2015-204720 A | 11/2015 |
| JP | 2016-072997 A | 5/2016 |
| JP | 2016-101031 A | 5/2016 |
| JP | 2016-116419 A | 6/2016 |
| JP | 2016-201957 A | 12/2016 |

* cited by examiner

US 11,271,448 B2

STATOR, MOTOR, AND METHOD OF MANUFACTURING STATOR

CROSS REFERENCE TO RELATED APPLICATIONS

This is a U.S. national stage of PCT Application No. PCT/JP2018/023987, filed on Jun. 25, 2018, and priority under 35 U.S.C. § 119(a) and 35 U.S.C. § 365(b) is claimed from U.S. Provisional Patent Application No. 62/526,499, filed on Jun. 29, 2017 and Japanese Application No. 2018-117037, filed Jun. 20, 2018; the entire contents of each application are hereby incorporated herein by reference.

FIELD OF THE INVENTION

The present disclosure relates to a stator, a motor, and a method of manufacturing the stator.

BACKGROUND

Motor coils are typically configured by winding coil wires around teeth of a stator core. From each coil, lead wires are drawn out as a winding start and a winding end of the coil wire. In the case where one coil wire is wound around a plurality of teeth, a connecting wire that connects the coils is routed on the upper sides of the coils. The connecting wire is routed on a radially outer side of the coils in order that the connecting wire of the coil wire, which has been wound earlier in a winding step, does not disturb the path of a coil wire to be wound afterward. A structure in which protrusions are provided radially outside the coils, and the connecting wires are disposed along the protrusions, has been known.

SUMMARY

An example embodiment of a stator of the present disclosure includes a stator core including a core back having an annular shape centering on a central axis extending in a vertical direction, and a plurality of teeth extending radially inward from the core back, an insulator attached to the stator core, and a plurality of coil wires wound around the teeth via the insulator. The insulator includes a plurality of base portions respectively surrounding outer peripheral surfaces of the teeth and an outer wall portion located immediately above the core back and extending in a circumferential direction. Each of the coil wires includes a plurality of coils into which the coil wire is wound around more than one of the teeth by concentrated winding, a connecting wire connecting the coils, and a pair of lead wires located at two ends of each of the coil wires and extending from the coils. The connecting wire of each of the coil wires includes outside-passing portions each extending along an outer surface of the outer wall portion on a radially outer side of the outer wall portion. The connecting wire of at least one of the coil wires includes an inside-passing portion that extends in a straight line on a radially inner side of the outer wall portion and is connected at two ends of the inside-passing portion to the outside-passing portions. The inside-passing portion is located on a radially inner side of the lead wires of the other coil wires.

An example embodiment of a motor of the present disclosure includes the stator, and a rotor that opposes the stator across a gap in a radial direction and is rotatable around the central axis.

An example embodiment of a method of manufacturing a stator of the present disclosure includes attaching an insulator to a stator core, and winding a plurality of coil wires each around a plurality of teeth via a connecting wire to form coils. The stator core includes a core back having an annular shape centering on a central axis extending in a vertical direction and the teeth extending radially inward from the core back. The insulator includes a plurality of base portions respectively surrounding the teeth and an outer wall portion located immediately above the core back and extending in a circumferential direction. In the step of wingding the coil wires, one of the coil wires to be wound earlier is a first coil wire, and another one of the coil wires to be wound after the first coil wire is a second coil wire. After a first end of the first coil wire is drawn out to a radially outer side of the outer wall portion as a lead wire, the first coil wire is wound around the teeth via the connecting wire, and a second end of the first coil wire is drawn out to the radially outer side of the outer wall portion as another lead wire. When the second coil wire is wound around the teeth via the connecting wire, the connecting wire is partly disposed along an outer surface of the outer wall portion on the radially outer side of the outer wall portion, and partly disposed in a straight line on a radially inner side of the outer wall portion in a region radially overlapping with one of the lead wires of the first coil wire.

The above and other elements, features, steps, characteristics and advantages of the present disclosure will become more apparent from the following detailed description of the example embodiments with reference to the attached drawings.

DETAILED DESCRIPTION

Hereinafter, motors according to example embodiments of the present disclosure will be described with reference to the accompanying drawings. The scales, the numbers, and the like of the components in the following drawings may differ from those of actual components to facilitate understanding of each configuration.

Each figure includes an X-Y-Z coordinate system as appropriate. In the present specification, a Z-axis extends in a vertical direction with its positive side extending upward and its negative side extending downward. A central axis J shown in the figures as appropriate is an imaginary line that is parallel to the Z-axis and extends in the vertical direction. In the following description, an axial direction of the central axis J, i.e., a direction parallel to the vertical direction is simply referred to as an "axial direction", a radial direction centering on the central axis J is simply referred to as a "radial direction" or "radially", and a circumferential direction around the central axis J is simply referred to as a "circumferential direction". In each figure, the circumferential direction is indicated by an arrow θ as appropriate.

Moreover, the positive side of the Z-axis in the axial direction is referred to as an "upper side" or "upward", and the negative side of the Z-axis in the axial direction is referred to as a "lower side" or "downward". Further, a clockwise direction when viewed in the axial direction from the upper side to the lower side, that is, the direction indicated by the arrow θ is referred to as "one circumferential direction". A counterclockwise direction when viewed in the circumferential direction from the upper side to the lower side, that is, the direction opposite to the direction indicated by the arrow θ is referred to as "the other circumferential direction".

Note that the vertical direction, the upper side, and the lower side simply describe the relative position of each component, and the actual position or the like may include positions other than those indicated by these wordings.

Figure 1:
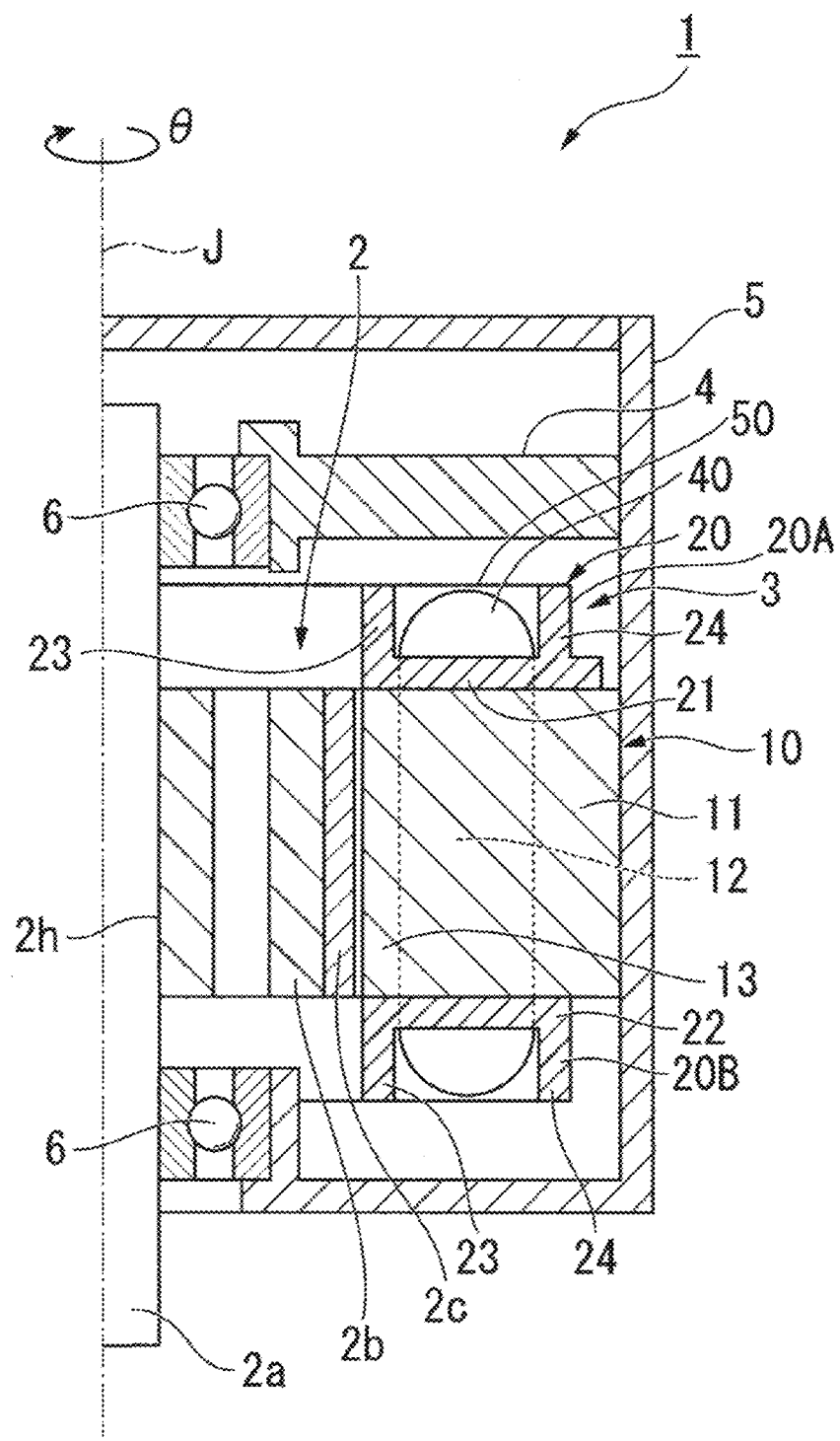
FIG. 1 is a sectional view of a motor according to an example embodiment of the present disclosure.

FIG. 1 is a sectional view of a motor 1 according to the present example embodiment. The motor 1 of the present example embodiment is a three-phase alternating current (AC) motor. The motor 1 of the present example embodiment is an inner rotor motor. The application of the motor 1 of the present example embodiment is not limited. The motor 1 is mounted on, for example, an electric pump and an electric power steering.

The motor 1 includes a rotor 2, a stator 3, a bearing holder 4, a housing 5, and a pair of bearings 6. The rotor 2 rotates relative to the stator 3 around the central axis J extending in the vertical direction.

The housing 5 has a cylindrical shape having a bottom. The housing 5 accommodates the rotor 2, the stator 3, the bearing holder 4, and the pair of bearings 6.

The bearing holder 4 is located on the upper side with respect to the stator 3. The bearing holder 4 is supported by an inner peripheral surface of the housing 5.

The pair of bearings 6 is arranged at an interval in the axial direction. The pair of bearings 6 supports a shaft 2a of the rotor 2. One of the pair of bearings 6 is supported by the bearing holder 4 and the other one is supported by the housing 5.

The rotor 2 rotates around the central axis J. The rotor 2 faces the stator 3 with a gap in the radial direction. The rotor 2 includes the shaft 2a having the central axis J, a rotor core 2b, and at least one magnet 2c.

The shaft 2a extends along the central axis J. In the example of the present example embodiment, the shaft 2a has a cylindrical shape extending in the axial direction. The shaft 2a is rotatably supported around the central axis J by the plurality of bearings 6. The shape of the shaft 2a is not limited to the cylindrical shape, and may be a tubular shape, for example.

The rotor core 2b is formed of a plurality of electromagnetic steel plates laminated in the axial direction. The rotor core 2b has a central hole 2h penetrating in the axial direction. The central hole 2h is located at the center of the rotor core 2b when viewed from the axial direction. The shaft 2a is disposed through the central hole 2h. The shaft 2a is fixed directly or indirectly to the rotor core 2b.

The magnet 2c is fixed to an outer peripheral surface of the rotor core 2b. The magnet 2c faces teeth 12 of the stator 3 in the radial direction. The magnet 2c of the present example embodiment is an annular magnet. In the magnet 2c, north poles and south poles are alternately arranged in the circumferential direction. The rotor 2 may include a plurality of magnets arranged in the circumferential direction. In such a case, magnets having the north pole on its radially outer side and magnets having the south pole on its radially outer side are alternately arranged in the circumferential direction.

The rotor 2 of the present example embodiment is a surface permanent magnet (SPM) rotor in which the magnet 2c is disposed on the outer peripheral surface of the rotor core 2b. However, the rotor 2 may be an interior permanent magnet (IPM) rotor in which a magnet is embedded in the rotor core. Further, the rotor core 2b and the magnet 2c may be accommodated inside a cylindrical rotor cover.

The stator 3 has a substantially annular shape centered on the central axis J. The stator 3 includes a stator core 10, and an insulator 20, and a plurality of coil wires 40. The coil wires 40 constitute coils 50.

The stator core 10 is disposed radially outside the rotor 2 and surrounds the rotor 2. The stator core 10 is formed by laminating, for example, a plurality of electromagnetic steel plates in the axial direction. Therefore, the stator core 10 extends in the axial direction with a uniform cross section. The stator core 10 of the present example embodiment is an integrated stator core that is not divided in the circumferential direction.

Figure 2:
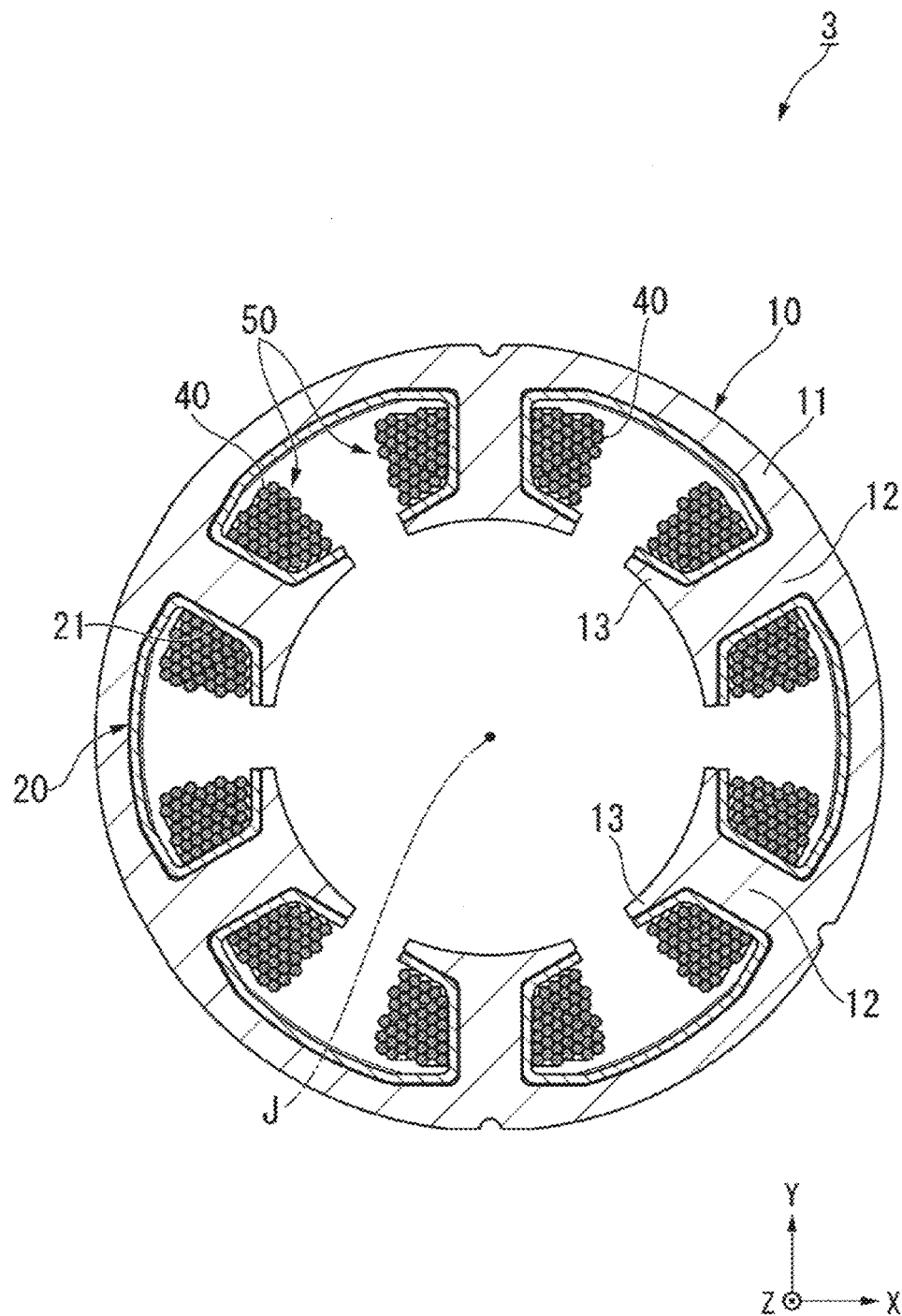
FIG. 2 is a sectional view of a stator according to an example embodiment of the present disclosure.

FIG. 2 is a sectional view of the stator 3.

As shown in FIG. 2, the stator core 10 includes a core back 11, a plurality of the teeth 12, and a plurality of umbrella portions 13.

The core back 11 has a substantially annular shape centered on the central axis J. The outer peripheral surface of the core back 11 is fixed to the inner peripheral surface of the housing 5.

The teeth 12 extend radially inward from the core back 11. In the present example embodiment, the stator core 10 includes six teeth 12. The teeth 12 have a substantially uniform section, and extend in the radial direction. The teeth 12 are arranged at equal intervals in the circumferential direction. Each of the teeth 12 is wound with one of the coil wires 40 through the insulator 20. Therefore, the coil wires 40 are disposed between two teeth 12 adjacent in the circumferential direction.

The umbrella portions 13 are located at the radially inner ends of the teeth 12. Each of the umbrella portions 13 is wider in the circumferential direction than each of the teeth 12. In other words, the dimension in the circumferential direction of each umbrella portion 13 is larger than the dimension in the circumferential direction of each tooth 12. The surfaces of the umbrella portions 13 facing radially inward form an arc shape centered on the central axis J when viewed from the axial direction. The surfaces of the umbrella portions 13 facing radially inward faces the magnet 2c of the rotor 2 in the radial direction.

As shown in FIG. 1, the insulator 20 is attached to the stator core 10. The insulator 20 is made of an insulating material (for example, an insulating resin). The insulator 20 is interposed between the stator core 10 and the coil wires 40 to ensure insulation between the stator core 10 and the coil wires 40.

The insulator 20 has an upper piece 20A and a lower piece 20B. Each of the upper piece 20A and the lower piece 20B is a single member. The upper piece 20A and the lower piece 20B each have a substantially annular shape centering on the central axis J. The upper piece 20A is attached to the stator core 10 from the upper side. The lower piece 20B is attached to the stator core 10 from the lower side. The upper piece 20A covers an upper end surface of the core back 11 and upper regions of both end surfaces in the circumferential direction of each of the teeth 12. Further, the lower piece 20B covers a lower end surface of the core back 11 and lower regions of both end surfaces in the circumferential direction of each of the teeth 12. The insulator 20 covers the outer peripheral surfaces of each of the teeth 12 with the upper piece 20A and the lower piece 20B thereof being attached to the stator core 10 from above and below, respectively.

The upper piece 20A and the lower piece 20B may have the same shape or different shapes. Further, the upper piece 20A and the lower piece 20B may be configured from a single member. That is, the insulator may be a single cylindrical member.

The insulator 20 has base portions 21, inner wall portions 23, and outer wall portion 24.

The base portions 21 surround the outer peripheral surfaces of the teeth 12, respectively. As many base portions 21 as the teeth 12 are provided. In the present example embodiment, the insulator 20 has six base portions 21. In the present example embodiment, the base portions 21 each surround the entire outer peripheral surface of corresponding one of the teeth 12. However, the base portions 21 may expose part of the outer peripheral surfaces of the teeth 12 as long as insulation between the teeth 12 and the coil wires 40 is ensured.

The insulator 20 includes a plurality of the inner wall portions 23. The inner wall portions 23 respectively overlap the umbrella portions 13 when viewed from the central axis J. The inner wall portions 23 extend in the circumferential direction.

The inner wall portions 23 are included in both of the upper piece 20A and the lower piece 20B. The upper piece 20A and the lower piece 20B each include the inner wall portions 23 as many as the number of the teeth 12. The inner wall portions 23 of the upper piece 20A are disposed immediately above the individual umbrella portions 13, and contact the upper end surfaces of the individual umbrella portions 13. The inner wall portions 23 of the lower piece 20B are disposed immediately below the individual umbrella portions 13, and contact the lower end surfaces of the individual umbrella portions 13. The inner wall portions 23 restrict radially inward movement of the coil wires 40 wound around the teeth 12.

The outer wall portion 24 has an annular shape centered on the central axis J. The outer wall portion 24 is included in the upper piece 20A and the lower piece 20B. The outer wall portion 24 included in the upper piece 20A is disposed immediately above the core back 11, and contacts the upper end surface of the core back 11. The outer wall portion 24 included in the lower piece 20B is disposed immediately below the core back 11, and contacts the lower end surface of the core back 11. That is, the outer wall portion 24 overlaps the core back 11 when viewed from the central axis J.

The outer wall portion 24 extends in the circumferential direction. The outer wall portion 24 faces the inner wall portions 23 in the radial direction. The outer wall portion 24 restricts radially outward movement of the coil wires 40 wound around the teeth 12.

Figure 3:
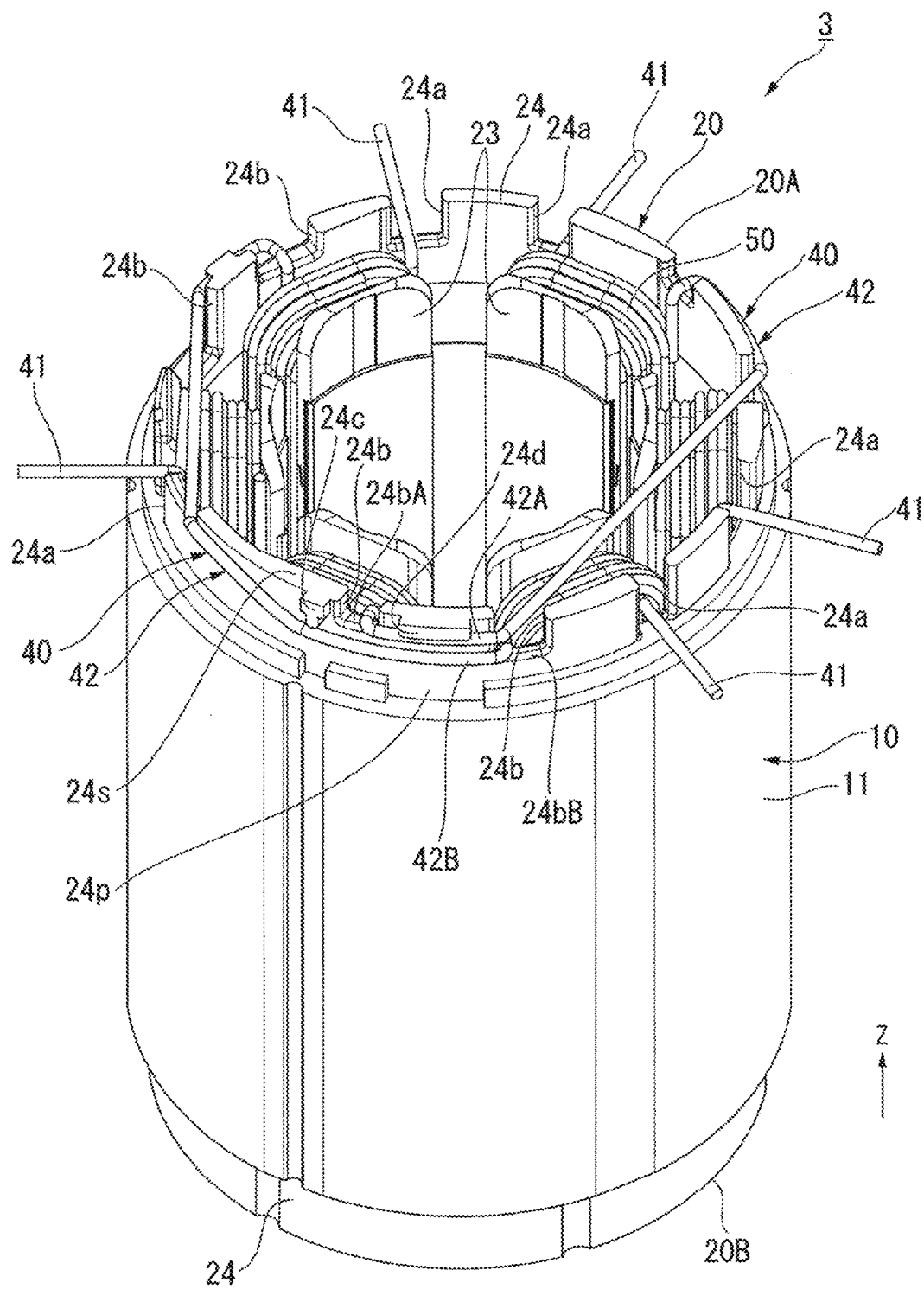
FIG. 3 is a perspective view of a stator according to an example embodiment of the present disclosure.

FIG. 3 is a perspective view of the stator 3. FIG. 3 is a diagram showing a state of the stator 3 immediately after a winding step is performed. After the winding step, a step of raising the lead wires 41 in the axial direction is performed.

As shown in FIG. 3, the outer wall portion 24 included in the upper piece 20A has a plurality of lead wire cutouts (cutouts) 24a, a plurality of connecting wire cutouts (cutouts) 24b, and a plurality of first projections (projections) 24c, and a plurality of second projections (projections) 24d.

Each of the lead wire cutouts 24a opens upward, and extends downward from the upper end surface of the outer wall portion 24. The lead wire cutouts 24a each penetrate in the radial direction. The outer wall portion 24 of the present example embodiment has five lead wire cutouts 24a. The five lead wire cutouts 24a each are located on a radially outer side with respect to the coils 50.

The lead wires 41 from the coils 50 are disposed through the lead wire cutouts 24a in the step of winding the coil wires 40. The lead wires 41 disposed through the lead wire cutouts 24a are drawn out from the coils 50 radially outward. This prevents the lead wires 41 from projecting upward from the coils 50 and from obstructing the paths of the coil wires 40 in the winding step. Note that the lead wires 41 disposed through the lead wire cutouts 24a are raised upward after the winding step is completed.

In the present example embodiment, no lead wire cutout 24a is provided radially outside one of the six coils 50 to be wound last. Being drawn out at the end of the winding step, one of the lead wires 41 extending from the coil 50 to be wound last does not obstruct the paths of the other coil wires 40. Accordingly, the one of the lead wires 41 extending from the coil 50 to be wound last is not necessary to be disposed through the lead wire cutout 24a, and thus, the lead wire cutout 24a is not provided outside the coil 50 to be wound last.

Each of the connecting wire cutouts 24b opens upward, and extends downward from the upper end surface of the outer wall portion 24. The connecting wire cutouts 24b each penetrate in the radial direction. The connecting wire cutouts 24b each allow one of the connecting wires 42 of the coil wires 40 to pass through. That is, the connecting wires 42 are routed from the radially inside to the radially outside of the outer wall portion 24 via the connecting wire cutouts 24b.

The first projections 24c and the second projections 24d are disposed on an outer surface 24p facing radially outward of the outer wall portion 24. The first projections 24c and the second projections 24d protrude radially outward from the outer surface 24p of the outer wall portion 24. The first projections 24c and the second projections 24d are located on the upper side with respect to the coil wires 40 routed along the outer surface 24p radially outside the outer wall portion 24. The first projections 24c and the second projections 24d restrict upward movement of the coil wires 40 and suppress the coil wires 40 from going over the upper side of the outer wall portion 24.

As shown in FIG. 3, the connecting wires 42 of the coil wires 40 are wound around the outer surface 24p of the outer wall portion 24. The connecting wires 42 extend along the outer surface 24p radially outside the outer wall portion 24. A pair of connecting wires 42 among the plurality of connecting wires 42 is arranged one above the other and extend radially outside of the outer wall portion along the outer surface 24*p* of the outer wall portion. The pair of connecting wires 42 is drawn radially outward of the outer wall portion 24 through the connecting wire cutouts 24*b*, respectively.

Here, of the pair of connecting wires 42 extending one above the other, one of the pair located on the upper side is referred to as an upper connecting wire 42A, and the other one of the pair disposed on the lower side is referred to as a lower connecting wire 42B. That is, the lower connecting wire 42B is located on the lower side with respect to the upper connecting wire 42A.

Further, some of the connecting wire cutouts 24*b* that allow the upper connecting wires 42A to pass therethrough are referred to as upper cutouts (first cutouts) 24*b*A, and some of the connecting wire cutouts 24*b* that allow the lower connecting wires 42B to pass therethrough are referred to as lower cutouts (second cutouts) 24*b*B.

Figure 4:
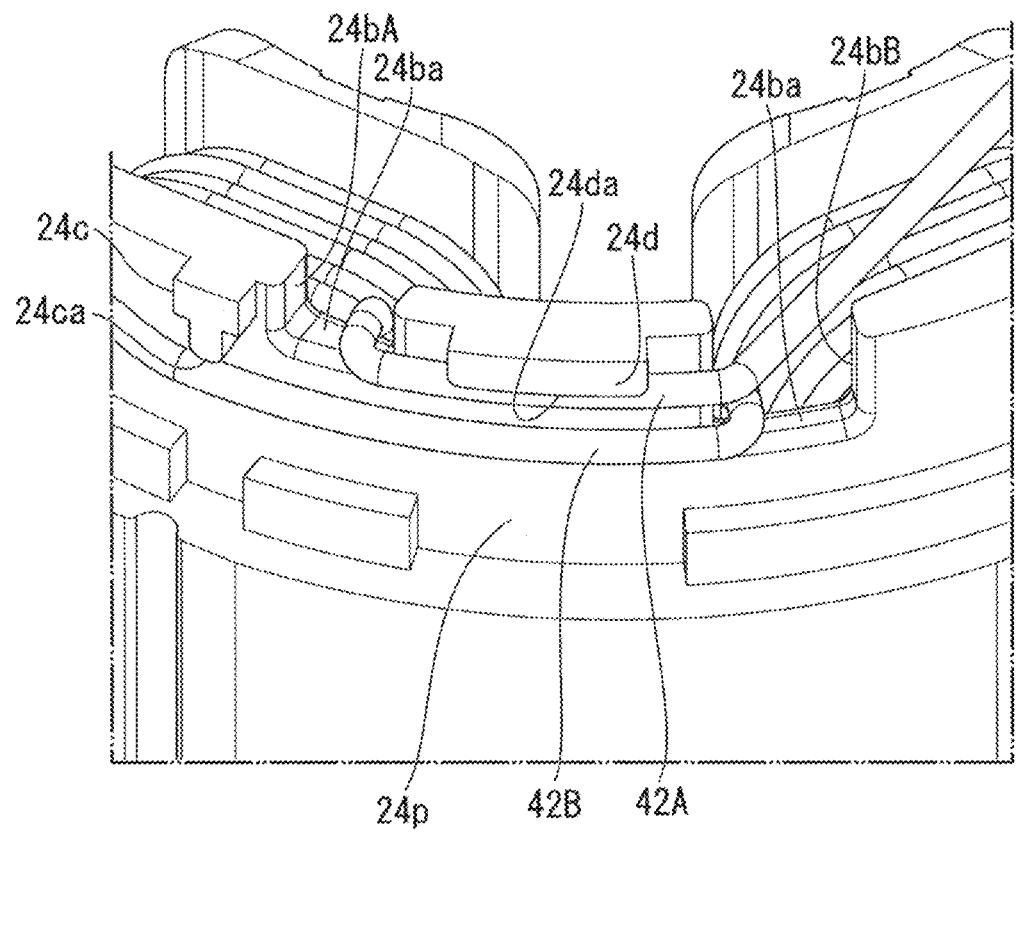
FIG. 4 is an enlarged view of a portion of the stator shown in FIG. 3.

FIG. 4 is a partially enlarged view of the stator 3.

As shown in FIG. 4, the upper cutouts 24*b*A and the lower cutouts 24*b*B have individual bottom surfaces 24*ba* facing upward. The bottom surfaces 24*ba* of the lower cutouts 24*b*B are located at the lower side with respect to the bottom surfaces 24*ba* of the upper cutouts 24*b*A.

The first projections 24*c* each have a lower surface 24*ca* facing downward. In the same manner, the second projections 24*d* each have a lower surface 24*da* facing downward. The lower surfaces 24*da* of the second projections 24*d* are located on the upper side with respect to the lower surfaces 24*ca* of the first projections 24*c*.

The bottom surfaces 24*ba* of the upper cutouts 24*b*A and the lower cutouts 24*b*B and the lower surfaces 24*ca* and 24*da* of the first projections 24*c* and the second projections 24*d* are arranged at different positions in the vertical direction. With respect to the vertical positions of these components, the lower surfaces 24*da* of the second projections 24*d*, the bottom surfaces 24*ba* of the upper cutouts 24*b*A, the lower surfaces 24*ca* of the first projections 24*c*, and the bottom surfaces 24*ba* of the lower cutouts 24*b*B are arranged in that order from the upper side to the lower side.

The lower surfaces 24*da* of the second projections 24*d* are located on the upper side with respect to the bottom surfaces 24*ba* of the upper cutouts 24*b*A. The distance in the vertical direction between the lower surfaces 24*da* of the second projections 24*d* and the bottom surfaces 24*ba* of the upper cutouts 24*b*A is slightly larger than the wire diameter of each of the coil wires 40.

The upper connecting wires 42A are drawn out radially outward of the outer wall portion 24 through the upper cutouts 24*b*A. The upper connecting wires 42A are routed along the outer surface 24*p* of the outer wall portion 24 in the circumferential direction. The upper connecting wires 42A pass immediately below the second projections 24*d*. That is, the upper connecting wires 42A and the second projections 24*d* overlap each other when viewed in the vertical direction. The upper connecting wires 42A may be in contact with the lower surfaces 24*da* of the second projections 24*d*. The upper connecting wires 42A extend in the circumferential direction, and are located between the lower surfaces 24*da* of the second projections 24*d* and the bottom surfaces 24*ba* of the upper cutouts 24*b*A in the vertical direction. According to the present example embodiment, the upper connecting wires 42A are disposed between the second projections 24*d* and the bottom surfaces 24*ba* of the upper cutouts 24*b*A, thereby stabilizing the routing of the upper connecting wires 42A.

The bottom surfaces 24*ba* of the lower cutouts 24*b*B are located on the lower side with respect to the lower surfaces 24*ca* of the first projections 24*c*. The distance in the vertical direction between the bottom surfaces 24*ba* of the lower cutouts 24*b*B and the lower surfaces 24*ca* of the first projections 24*c* is slightly larger than the wire diameter of the coil wires 40.

The lower connecting wires 42B are drawn out radially outward of the outer wall portion 24 through the lower cutouts 24*b*B. The lower connecting wires 42B are routed along the outer surface 24*p* of the outer wall portion 24 in the circumferential direction. The lower connecting wires 42B pass immediately below the first projections 24*c*. That is, the lower connecting wires 42B and the first projections 24*c* overlap each other when viewed in the vertical direction. The lower connecting wires 42B may be in contact with the lower surfaces 24*ca* of the first projections 24*c*. The lower connecting wires 42B extend in the circumferential direction, and are located between the lower surfaces 24*ca* of the first projections 24*c* and the bottom surfaces 24*ba* of the lower cutouts 24*b*B in the vertical direction. According to the present example embodiment, the lower connecting wires 42B are disposed between the first projections 24*c* and the bottom surfaces 24*ba* of the lower cutouts 24*b*B, thereby stabilizing the routing of the lower connecting wires 42B.

In the present example embodiment, the length of the second projections 24*d* in the circumferential direction is greater than that of the first projections 24*c*. In the winding step, the upper connecting wires 42A are routed on the second projections 24*d*. The upper connecting wires 42A pass near the upper end of the outer wall portion 24. According to the present example embodiment, the second projections 24*d* having a greater length in the circumferential direction grip the upper connecting wires 42A with the sufficient length in the circumferential direction, which effectively suppresses the upper connecting wires 42A from falling off inwardly from the outer wall portion 24. On the other hand, the lower connecting wires 42B are routed on the first projections 24*c* in the winding step. The first projections 24*c* have a shorter length in the circumferential direction, so that the lower connecting wires 42B can be easily routed on the first projections 24*c*.

In the present example embodiment, the upper connecting wires 42A are disposed through the upper cutouts 24*b*A, and therefore hardly move to the lower side with respect to the bottom surfaces 24*ba* of the upper cutouts 24*b*A. Further, the lower connecting wires 42B are disposed immediately below the first projections 24*c*, and therefore hardly move upward over the lower surfaces 24*ca* of the first projections 24*c*. In the present example embodiment, the bottom surfaces 24*ba* of the upper cutouts 24*b*A are located on the upper side with respect to the lower surfaces 24*ca* of the first projections 24*c*. Therefore, the present example embodiment can suppress the upper connecting wires 42A and the lower connecting wires 42B from contacting each other.

In the present example embodiment, the first projections 24*c* are disposed adjacent to the upper cutouts 24*b*A in the circumferential direction. That is, the first projections 24*c* are disposed near the upper cutouts 24*b*A. With this configuration, the first projections 24*c* suppress upward movement of the lower connecting wires 42B, and the upper cutouts 24*b*A suppress downward movement of the upper connecting wires 42A. According to the present example embodiment, the first projections 24*c* and the upper cutouts 24*b*A are arranged adjacent to each other in the circumferential direction, which effectively suppress the upper connecting wires 42A and the lower connecting wires 42B from being loosened and coming into contact with each other.

Next, the coil wire 40 will be described in more detail.

Figure 5:
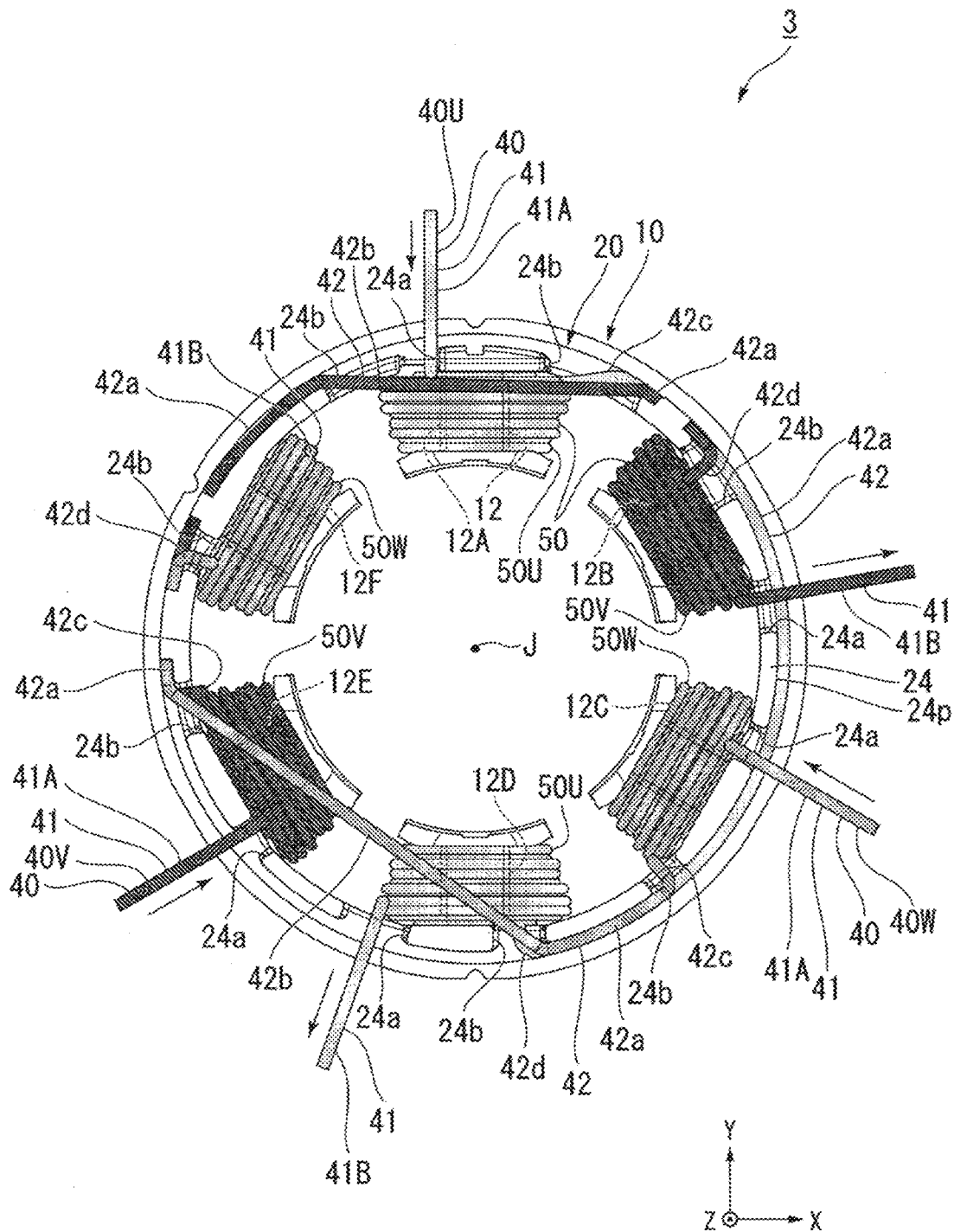
FIG. 5 is a plan view of a stator according to an example embodiment of the present disclosure.

FIG. 5 is a plan view schematically showing the stator 3.

The coil wires 40 are wound around the teeth 12 via the insulator 20 to form the coils 50. The coil wires 40 are wound around the teeth 12 by concentrated winding. The stator 3 of the present example embodiment includes three coil wires 40.

When the three coil wires 40 are to be distinguished from each other in the following description, they are referred to as a U-phase coil wire (first coil wire) 40U, a V-phase coil wire (second coil wire) 40V, and a W-phase coil wire (third coil wire) 40W.

Each of the three coil wires 40 includes a plurality of coils 50 (two coils 50 in the present example embodiment), a connecting wire 42 that connects the plurality of coils 50, and a pair of the lead wires 41 located at both ends of each of the coil wires 40 and extending from each of the coils 50. Of the pair of lead wires 41, one is located at a starting point of winding each of the coil wires 40, and the other is located at an ending point of winding each of the coil wires 40. When the pair of lead wires 41 is to be distinguished from each other in the following description, one located at the starting point of winding is referred to as a starting point lead wire 41A, and the other located at the ending point of winding is referred to as an ending point lead wire 41B. In the present example embodiment, the starting point lead wire 41A and the ending point lead wire 41B are drawn out from the radially outer end of the coils 50.

The six coils 50 provided in the stator 3 are classified into two U-phase coils 50U, two V-phase coils 50V, and two W-phase coils 50W.

In FIG. 5, one of the teeth 12 positioned in the positive Y-direction (12 o'clock direction) with respect to the central axis J is referred to as a first tooth 12A. Further, the other teeth 12 are referred to as a second tooth 12B to a sixth tooth 12F in one circumferential direction from the first tooth 12A.

The two U-phase coils 50U are configured by winding the U-phase coil wire 40U around two different teeth 12. The two U-phase coils 50U are configured by winding the U-phase coil wire 40U around the first tooth 12A and the fourth tooth 12D, respectively. The two U-phase coils 50U are connected to each other through the connecting wire 42. Further, the lead wire 41 is drawn out from each of the two U-phase coils 50U.

The two V-phase coils 50V are configured by winding the V-phase coil wire 40V around two different teeth 12. The two V-phase coils 50V are configured by winding the V-phase coil wire 40V around the second tooth 12B and the fifth tooth 12E, respectively. The two V-phase coils 50V are connected to each other through the connecting wire 42. Further, the lead wire 41 is drawn out from each of the two V-phase coils 50V.

The two W-phase coils 50W are configured by winding the W-phase coil wire 40W around two different teeth 12. The two W-phase coils 50W are configured by winding the W-phase coil wire 40W around the third tooth 12C and the sixth tooth 12F, respectively. The two W-phase coils 50W are connected to each other through the connecting wire 42. Further, the lead wire 41 is drawn out from each of the two W-phase coils 50W.

Figure 6:
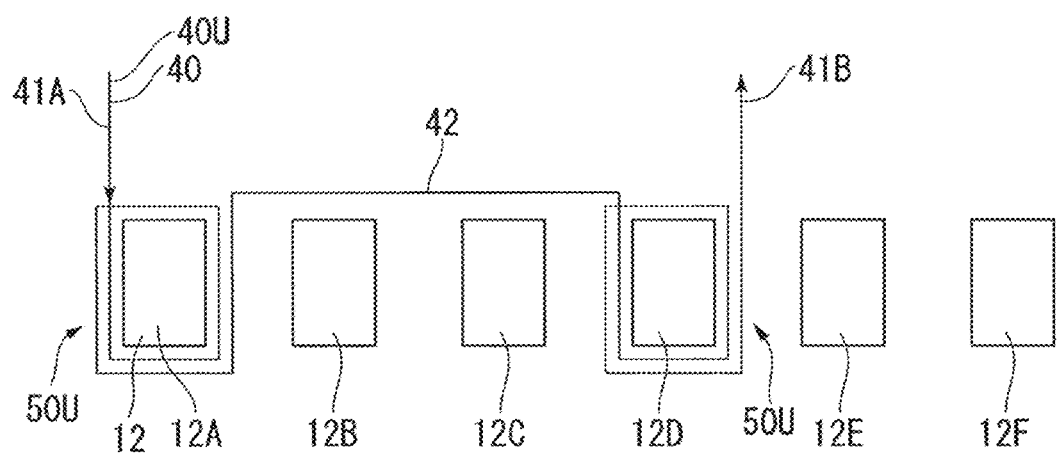
FIG. 6 is a diagram showing a process for winding U-phase coils according to an example embodiment of the present disclosure.
Figure 7:
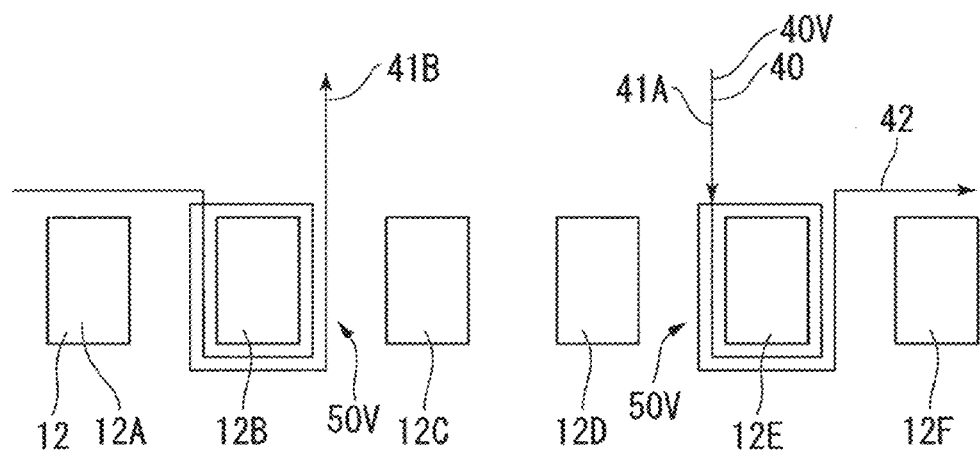
FIG. 7 is a diagram showing a process for winding V-phase coils according to an example embodiment of the present disclosure.
Figure 8:
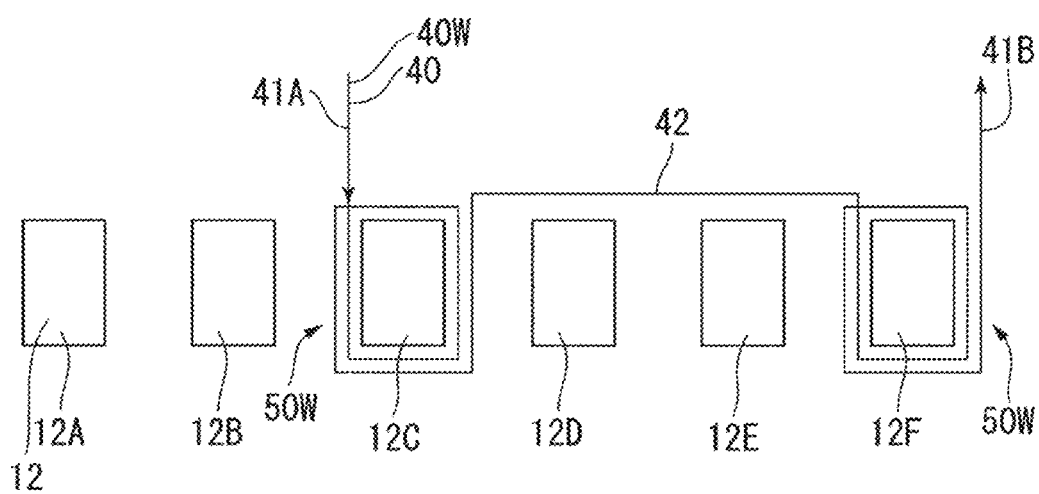
FIG. 8 is a diagram showing a process for winding W-phase coils according to an example embodiment of the present disclosure.

FIGS. 6 to 8 are diagrams showing processes for winding the U-phase coil wire 40U, the V-phase coil wire 40V, and the W-phase coil wire 40W, respectively. Note that FIGS. 6 to 8 schematically show the first to sixth teeth 12A to 12F as viewed from the central axis J (i.e., from the radially inner side).

The three coil wires 40 are wound around the teeth 12 in the order of the U-phase coil wire 40U, the V-phase coil wire 40V, and the W-phase coil wire 40W. All the coil wires 40 are wound around the teeth 12 counterclockwise when viewed in the axial direction.

As shown in FIG. 5, the connecting wires 42 of all the coil wires 40 (U-phase coil wire 40U, V-phase coil wire 40V, and W-phase coil wire 40W) each include a drawn-out portion 42c, a drawn-in portion 42d, and at least one outside-passing portion 42a.

Further, the connecting wires 42 of the V-phase coil wire 40V and the W-phase coil wire 40W each further include an inside-passing portion 42b that extends in a straight line radially inside the outer wall portion 24. In other words, the connecting wire 42 of the U-phase coil wire 40U does not include the inside-passing portion 42b.

The drawn-out portions 42c are drawn from the coils 50 wound around the teeth 12. The drawn-out portions 42c are drawn radially outward from the coils 50, and are further drawn radially outside the outer wall portion 24 through the connecting wire cutouts 24b, respectively. Each of the drawn-out portions 42c is connected to the end in the other circumferential direction of the outside-passing portion 42a.

The outside-passing portion 42a extends in the circumferential direction. The outside-passing portion 42a extends along the outer surface 24p of the outer wall portion 24 on the radially outer side of the outer wall portion 24. The U-phase coil wire 40U includes one outside-passing portion 42a. On the other hand, the V-phase coil wire 40V and the W-phase coil wire 40W each include two outside-passing portions 42a. In the V-phase coil wire 40V and the W-phase coil wire 40W, the inside-passing portion 42b is provided between the two outside-passing portions 42a.

Both ends of each of the inside-passing portions 42b are connected to the corresponding outside-passing portions 42a. Both ends of each of the inside-passing portions 42b pass through the corresponding connecting wire cutouts 24b. Accordingly, each of the inside-passing portions 42b passes radially inside the outer wall portion 24. Each of the inside-passing portions 42b extends in a straight line between a pair of the connecting wire cutouts 24b.

Each of the drawn-in portions 42d is connected to the end in the one circumferential direction of the outside-passing portion 42a. Each of the drawn-in portions 42d is drawn from the radially outer side to the radially inner side of the outer wall portion 24 through corresponding one of the connecting wire cutouts 24b, and is connected to one of the coils 50.

As shown in FIG. 6, the U-phase coil wire 40U is wound around the first tooth 12A, and then wound around the fourth tooth 12D. Thereby, the U-phase coil wire 40U constitutes a pair of the U-phase coils 50U. The starting point lead wire 41A extends from one of the pair of U-phase coils 50U wound around the first tooth 12A. Further, the ending point lead wire 41B extends from the other one of the pair of U-phase coils 50U wound around the fourth tooth 12D. As shown in FIG. 5, the starting point lead wire 41A and the ending point lead wire 41B of the U-phase coil wire 40U are drawn radially outward through the lead wire cutouts 24a.

As shown in FIG. 5, the pair of U-phase coils 50U is connected to each other via one of the connecting wires 42. One of the drawn-out portions 42c of the connecting wires 42 extends from one of the pair of U-phase coils 50U wound around the first tooth 12A. The one of the drawn-out portions 42c is drawn out radially outward from the outer wall portion 24 through one of the connecting wire cutouts 24b that is located the radially outside of the first tooth 12A to be connected to corresponding one of the outside-passing portions 42a.

The outside-passing portion 42a of the connecting wire 42 of the U-phase coil wire 40U extends in the one circumferential direction along the outer surface 24p of the outer wall portion 24 located radially outside of the second tooth 12B and the third tooth 12C. The drawn-in portion 42d of the connecting wire 42 of the U-phase coil wire 40U is drawn into the radially inside of the outer wall portion 24 through one of the connecting wire cutouts 24b located radially outside of the fourth tooth 12D. The connecting wire 42 of the U-phase coil wire 40U is wound around the fourth tooth 12D at the end of the drawn-in portion 42d thereof, and is connected to one of the U-phase coils 50U.

As shown in FIG. 7, the V-phase coil wire 40V is wound around the fifth tooth 12E, and then wound around the second tooth 12B. Thereby, the V-phase coil wire 40V constitutes a pair of the V-phase coils 50V. The starting point lead wire 41A extends from one of the pair of V-phase coils 50V wound around the fifth tooth 12E. Further, the ending point lead wire 41B extends from the other one of the pair of V-phase coils 50V wound around the second tooth 12B. As shown in FIG. 5, the starting point lead wire 41A and the ending point lead wire 41B of the V-phase coil wire 40V are drawn radially outward through the lead wire cutouts 24a.

As shown in FIG. 5, the pair of V-phase coils 50V is connected to each other via one of the connecting wires 42. One of the drawn-out portions 42c of the connecting wires 42 extends from one of the pair of V-phase coils 50V wound around the fifth tooth 12E. The one of the drawn-out portions 42c is drawn out radially outward from the outer wall portion 24 through one of the connecting wire cutouts 24b that is located radially outside of the fifth tooth 12E to be connected to corresponding one of the outside-passing portions 42a.

The one of outside-passing portions 42a of the connecting wire 42 of the V-phase coil wire 40V extends in the one circumferential direction along the outer surface 24p of the outer wall portion 24 located radially outside of the sixth tooth 12F and is connected to the inside-passing portion 42b. The inside-passing portion 42b is drawn in radially inside of the outer wall portion 24 through one of the connecting wire cutouts 24b located between the sixth tooth 12F and the first tooth 12A in the circumferential direction.

The inside-passing portion 42b drawn in radially inside of the outer wall portion 24 is disposed in a straight line immediately above the first tooth 12A. The inside-passing portion 42b of the V-phase coil wire 40V passes immediately above one of the U-phase coils 50U wound around the first tooth 12A. That is, the inside-passing portion 42b of the V-phase coil wire 40V partly overlaps with one of the already wound coils 50 (U-phase coil 50U in the present example embodiment) when viewed in the axial direction. Further, the inside-passing portion 42b is located radially inside the starting point lead wire 41A extending from one of the U-phase coils 50U wound around the first tooth 12A.

The inside-passing portion 42b passes immediately above the first tooth 12A, then passes through one of the connecting wire cutouts 24b located between the first tooth 12A and the second tooth 12B in the circumferential direction, and is drawn out radially outward from the outer wall portion 24. The inside-passing portion 42b drawn radially outward of the outer wall portion 24 is connected to one of the outside-passing portions 42a. The one of the outside-passing portions 42a extends in the one circumferential direction along the outer surface 24p of the outer wall portion 24, and is connected to the drawn-in portion 42d. The drawn-in portion 42d of the V-phase coil wire 40V is drawn in radially inside of the outer wall portion 24 through one of the connecting wire cutouts 24b located radially outside of the second tooth 12B. The connecting wire 42 of the V-phase coil wire 40V is wound around the second tooth 12B at the end of the drawn-in portion 42d thereof, and is connected to one of the V-phase coils 50V.

As shown in FIG. 8, the W-phase coil wire 40W is wound around the third tooth 12C, and then wound around the sixth tooth 12F. Thereby, the W-phase coil wire 40W constitutes a pair of the W-phase coils 50W. The starting point lead wire 41A extends from one of the pair of W-phase coils 50W wound around the third tooth 12C. Further, the ending point lead wire 41B extends from the other one of the pair of W-phase coils 50W wound around the sixth tooth 12F. As shown in FIG. 5, the starting point lead wire 41A of the W-phase coil wire 40W is drawn radially outward through one of the lead wire cutouts 24a. Further, the ending point lead wire 41B of the W-phase coil wire W is drawn upward.

As shown in FIG. 5, the pair of W-phase coils 50W is connected to each other via one of the connecting wires 42. One of the drawn-out portions 42c of the connecting wires 42 extends from one of the pair of W-phase coils 50W wound around the third tooth 12C. The drawn-out portion 42c is drawn out radially outward from the outer wall portion 24 through one of the connecting wire cutouts 24b located radially outside of the third tooth 12C to be connected to corresponding one of the outside-passing portions 42a.

The outside-passing portion 42a of the connecting wire 42 of the W-phase coil wire 40W extends in the one circumferential direction along the outer surface 24p of the outer wall portion 24, and is connected to the inside-passing portion 42b. The inside-passing portion 42b is drawn in radially inside of the outer wall portion 24 through one of the connecting wire cutouts 24b located between the third tooth 12C and the fourth tooth 12D in the circumferential direction.

The inside-passing portion 42b drawn in radially inside of the outer wall portion 24 is disposed in a straight line immediately above the fourth tooth 12D and the fifth tooth 12E. The inside-passing portion 42b of the W-phase coil wire 40W passes immediately above one of the U-phase coils 50U wound around the fourth tooth 12D and one of the V-phase coils 50V wound around the fifth tooth 12E. That is, the inside-passing portion 42b of the W-phase coil wire 40W partly overlaps with the already wound coils 50 (one of the U-phase coils 50U and one of the V-phase coils 50V in the present example embodiment) when viewed in the axial direction. The inside-passing portion 42b is located radially inside of the ending point lead wire 41B extending from one of the U-phase coils 50U wound around the fourth tooth 12D. Further, the inside-passing portion 42b is located radially inside of the starting point lead wire 41A extending from one of the V-phase coils 50V wound around the fifth tooth 12E.

The inside-passing portion 42b passes immediately above the fourth tooth 12D and the fifth tooth 12E, then passes through one of the connecting wire cutouts 24b located between the fifth tooth 12E and the sixth tooth 12F in the circumferential direction, and is drawn out radially outward from the outer wall portion 24. The inside-passing portion 42b drawn radially outward of the outer wall portion 24 is connected to one of the outside-passing portions 42a. The one of the outside-passing portions 42a extends in the one circumferential direction along the outer surface 24p of the outer wall portion 24, and is connected to the drawn-in portion 42d. The drawn-in portion 42d of the W-phase coil wire 40W is drawn in radially inside of the outer wall portion 24 through one of the connecting wire cutouts 24b located radially outside of the sixth tooth 12F. The connecting wire 42 of the W-phase coil wire 40W is wound around the sixth tooth 12F at the end of the drawn-in portion 42d thereof, and is connected to one of the W-phase coils 50W.

Next, a method of manufacturing the stator 3 will be described.

The method of manufacturing the stator 3 mainly includes a step of attaching the insulator 20 to the stator core 10, and a winding step. The winding step is a step of winding the plurality of coil wires 40 around the plurality of teeth 12 via the connecting wires 42 to form the coils 50, respectively.

In the winding step, winding of the U-phase coil wire 40U, the V-phase coil wire 40V, and the W-phase coil wire 40W is performed in that order. In the winding step, the starting point lead wires 41A and the ending point lead wires 41B are drawn radially outward through the connecting wire cutouts 24b of the outer wall portion 24.

After the winding step to wind the three coil wires 40 is completed, a step of raising the lead wires 41 (the starting point lead wire 41A and the ending point lead wire 41B) of the coil wire 40 of each phase is performed. In this step, the lead wire 41 is drawn in the axial direction. The lead wires 41 extending upward from the coils 50 are connected to a power supply device via a conductive member, such as a bus bar.

The connecting wires 42 of the coil wires 40 are disposed in the circumferential direction along the outer surface 24p of the outer wall portion 24 to form the outside-passing portions 42a so as not to obstruct the path of a winding machine at the time of winding the sequentially wound other coils 50.

Here, the winding step of the U-phase coil wire 40U and the V-phase coil wire 40V is focused. In the manufacturing method of the present example embodiment, the U-phase coil wire 40U is wound, and thereafter the V-phase coil wire 40V is wound. That is, the U-phase coil wire 40U is a coil wire to be wound earlier (first coil wire), and the V-phase coil wire 40V is a coil wire to be wound afterward (second coil wire).

In the winding step of the U-phase coil wire 40U, a winding machine (or a winding operator) places the connecting wire 42 of the U-phase coil wire 40U radially outside of the outer wall portion 24 along the outer surface 24p of the outer wall portion 24. In this manner, the outside-passing portion 42a is provided with the connecting wire 42 of the U-phase coil wire 40U.

Further, in the winding step of the V-phase coil wire 40V, the winding machine places the connecting wire 42 of the V-phase coil wire 40V radially outside of the outer wall portion 24 along the outer surface 24p of the outer wall portion 24, and places a part of the connecting wire 42 in a straight line radially inside of the outer wall portion 24 in a region overlapping with the lead wire 41 of the U-phase coil wire 40U in the radial direction. In this manner, the outside-passing portion 42a and the inside-passing portion 42b are provided with the connecting wire 42 of the V-phase coil wire 40V. Further, the inside-passing portion 42b of the V-phase coil wire 40V is disposed radially inwardly from the lead wire 41 of another coil wire 40 (the U-phase coil wire 40U in the present example embodiment).

In the conventional structure, the connecting wires of the coil wires do not include the inside-passing portion 42b of the present example embodiment. The connecting wires of the conventional structure pass outside the outer wall portion in substantially the entire length, and pass immediately above the lead wire of the coil wires that have been wound earlier. Thus, in raising the lead wires after the winding step, the lead wires come into contact with the connecting wires of the other coil wires. This may cause insufficient insulation between the coil wires of different phases. In addition, the raised lead wires are extended radially outward, which increases the radial dimension of the stator.

According to the present example embodiment, the connecting wire 42 of the V-phase coil wire 40V to be wound afterward passes radially inwardly from the outer wall portion 24 in a region overlapping in the radial direction with the lead wire 41 of the U-phase coil wire 40U that has been wound earlier. Therefore, even when the lead wires 41 of the U-phase coil wire 40U are raised after the winding step, they do not interfere with the connecting wire 42 of the V-phase coil wire 40V. This ensures insulation between the U-phase coil wire 40U and the V-phase coil wire 40V. Further, this suppresses the raised lead wires 41 from being extended radially outward, and thus suppresses an increase in the radial dimension of the stator 3.

The relationship between one of the coil wires 40 to be wound earlier and another one of the coil wires 40 to be wound afterward has been described focusing on the U-phase coil wire 40U and the V-phase coil wire 40V. However, the same applies to the relationship between the W-phase coil wire 40W as the coil wire 40 to be wound later and the coil wires to be would earlier (U-phase coil wire 40U and V-phase coil wire 40V) when the W-phase coil wire 40W is focused on.

In the winding step, the coil wires 40 are once drawn radially outside of the outer wall portion 24 after being wound around the teeth 12. That is, in the winding step, the coil wires 40 are not drawn out as the inside-passing portions 42b directly after being wound around the teeth 12. Further, in the winding step, the coil wires 40 are once drawn radially outside of the outer wall portion 24 after constituting the inside-passing portions 42b, and are then wound around the teeth 12. That is, in the winding step, the coil wires 40 are not wound around the teeth 12 directly from the inside-passing portions 42b. Therefore, according to the present example embodiment, each of the inside-passing portions 42b is connected to the outside-passing portions 42a at both ends thereof.

With this configuration, the inside-passing portions 42b do not obstruct the path of the winding machine when the coil wires 40 are wound around the teeth 12. Further, the inside-passing portions 42b are hooked around the outer wall portions 24 at both ends thereof. With this configuration, the inside-passing portions 42b can be extended in a direction orthogonal to the vertical direction. As a result, contact between the inside-passing portions 42b and the coils 50 located immediately below the inside-passing portions 42b can be suppressed, which stabilizes the performance of the stator 3.

According to the present example embodiment, the connecting wires 42 of the V-phase coil wire 40V and the W-phase coil wire 40W have the individual inside-passing portions 42b. Since the inside-passing portions 42b extend in a straight line, the connecting wires 42 can be shortened as compared with the case where the connecting wires 42 pass radially outside of the outer wall portion 24. This results in reduction in the weight of the stator 3 and in the cost of the coil wires 40.

Figure 9:
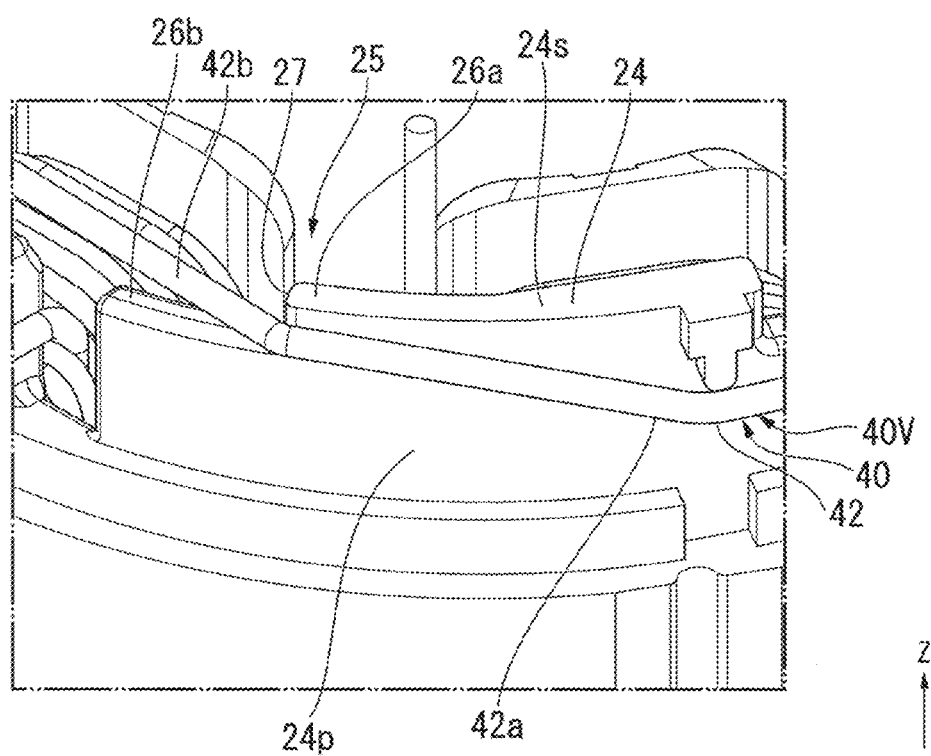
FIG. 9 is a perspective view showing a hook portion according to an example embodiment of the present disclosure.

FIG. 9 is a perspective view of part of the connecting wire 42 of the V-phase coil wire 40V.

The configuration of the connecting wire 42 of the V-phase coil wire 40V will be described below, but the same configuration can be applied to the W-phase coil wire 40W that has the inside-passing portion 42b in the same manner as the V-phase coil wire 40V.

The outer wall portion 24 includes hook portions 25. As described above, the connecting wire 42 of the V-phase coil wire 40V has the inside-passing portion 42b connected to the outside-passing portions 42a at both ends thereof. The inside-passing portion 42b is routed radially inward from the outer wall portion 24 at the boundaries between the outside-passing portions 42a and the inside-passing portion 42b. The connecting wire 42 is hooked on the hook portions 25 at the boundaries between the outside-passing portions 42a and the inside-passing portion 42b.

In the winding step, tension is applied to the connecting wire 42 so that the connecting wire 42 is not loosened. The connecting wire 42 is hooked on the hook portions 25 at the boundaries between the outside-passing portions 42a and the inside-passing portion 42b, so that the outside-passing portions 42a are suppressed from moving radially inward from the outer wall portion 24, and can be disposed along the radially outer side of the outer wall portion 24.

The outer wall portion 24 has an upper end surface 24s facing upward. The upper end surface 24s includes a first region 26a and a second region 26b having different heights, and a step portion 27 that connects the first region 26a and the second region 26b. The first region 26a is higher than the second region 26b. In the present example embodiment, the step portion 27 constitutes each of the hook portions 25. That is, the connecting wire 42 extends in the circumferential direction at the outside-passing portions 42a of the connecting wire 42 and is hooked on the step portions 27, so that the connecting wire 42 is drawn radially inward from the outer wall portion 24 as the inside-passing portion 42b.

According to the present example embodiment, the outer wall portion 24 includes the first region 26a and the second region 26b having different heights, and the step portion 27 between the first region 26a and the second region 26b forms each of the hook portions 25. Thus, the connecting wire 42 can be hooked on the hook portions 25 without a large movement of the nozzle of the winding machine in the vertical direction, which shortens the time required for the winding step. In addition, since the second region 26b is lower than the first region 26a, the nozzle of the winding machine can be suppressed from contacting the outer wall portion 24 in the second region 26b.

Figure 10:
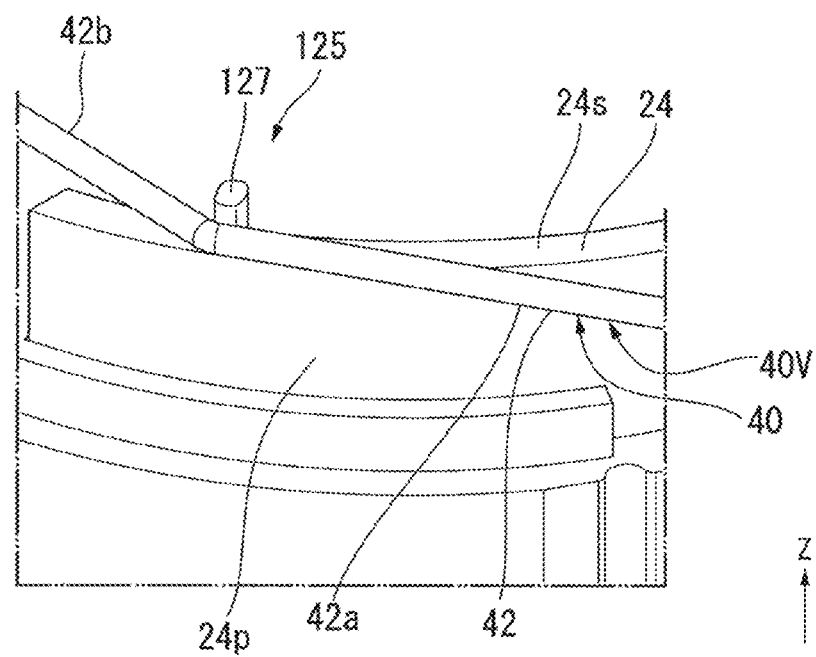
FIG. 10 is a perspective view showing a hook portion according to a first modification of an example embodiment of the present disclosure.

Hook portions 125 of a first modification that can be employed in the present example embodiment will be described below with reference to FIG. 10.

Elements that are identical to those of the above example embodiment will be denoted by identical reference numbers, and detailed explanation of those elements will be omitted.

In the same manner as the above-described example embodiment, the connecting wire 42 is hooked on the hook portions 125 of the present modification at the boundaries between the outside-passing portions 42a and the inside-passing portion 42b. The hook portions 125 of the present modification are disposed on the upper end surface 24s of the outer wall portion 24. In the present modification, the hook portions 125 are first protrusions 127 that protrude upward from the upper end surface 24s of the outer wall portion 24. That is, the first protrusions 127 constitute the hook portions 125.

The connecting wire 42 is drawn radially inward from the outer wall portion 24 as the inside-passing portion 42b by extending in the circumferential direction at the outside-passing portions 42a of the connecting wire 42 and being hooked on the first protrusions 127. The connecting wire 42 extends in the circumferential direction at the outside-passing portions 42a of the connecting wire 42 and is hooked on the first protrusions 127 so that the connecting wire 42 is drawn radially inward from the outer wall portion 24 as the inside-passing portion 42b.

Figure 11:
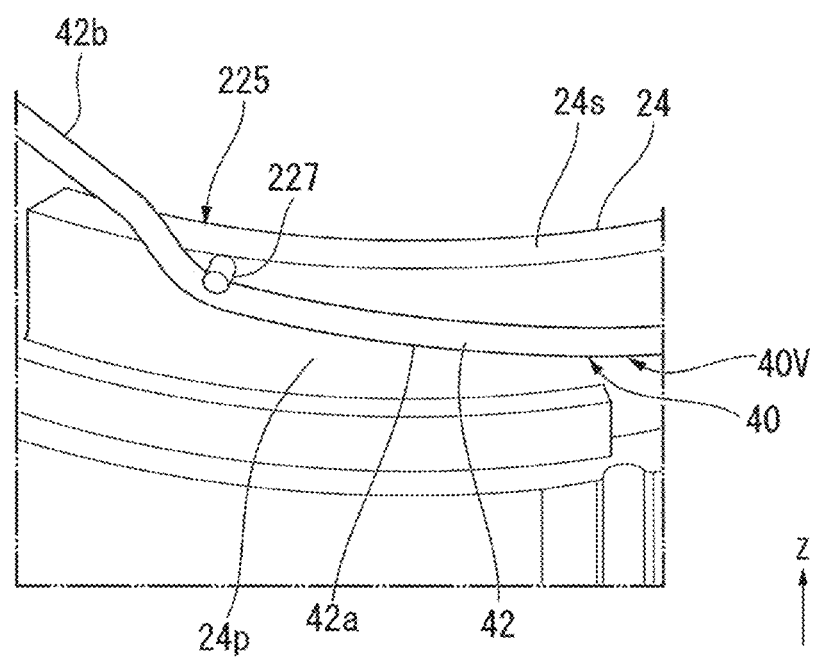
FIG. 11 is a perspective view showing a hook portion according to a second modification of an example embodiment of the present disclosure.

Next, hook portions 225 of a second modification that can be employed in the present example embodiment will be described with reference to FIG. 11.

Elements that are identical to those of the above example embodiment will be denoted by identical reference numbers, and detailed explanation of those elements will be omitted.

In the same manner as the above-described example embodiment, the connecting wire 42 is hooked on the hook portions 225 of the present modification at the boundaries between the outside-passing portions 42a and the inside-passing portion 42b. The hook portions 225 of the present modification are provided with the outer surface 24p of the outer wall portion 24. In the present modification, the hook portions 225 are second protrusions 227 that protrude radially outward from the outer surface 24p of the outer wall portion 24. That is, the second protrusions 227 constitute the hook portions 125.

The connecting wire 42 is drawn radially inward from the outer wall portion 24 as the inside-passing portion 42b by extending in the circumferential direction at the outside-passing portions 42a of the connecting wire 42 and being hooked on the second protrusions 227. The connecting wire 42 extends in the circumferential direction at the outside-passing portions 42a of the connecting wire 42 and is hooked on the second protrusions 227 so that the connecting wire 42 is drawn radially inward from the outer wall portion 24 as the inside-passing portion 42b.

Although the example embodiments and modifications of the present disclosure have been described above, the configurations and the combinations of the elements described in the example embodiments and modifications are merely examples, and therefore addition, omission, substation and other modifications may be made appropriately within the scope of the present disclosure. Further, the present disclosure should not be limited by the example embodiments.

For example, the stator 3 according to the above-described example embodiment has six coils 50. However, the number of the coils 50 of the stator 3 is not limited to the number described in the present example embodiment.

In the above-described example embodiment, two coils 50 are formed by one coil wire 40. However, three or more coils may be formed by one coil wire 40.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A stator comprising:
    a stator core including a core back having an annular shape centering on a central axis extending in a vertical direction, and a plurality of teeth extending radially inward from the core back;
    an insulator attached to the stator core; and
    a plurality of coil wires wound around the teeth via the insulator; wherein
    the insulator includes:
        a plurality of base portions respectively surrounding outer peripheral surfaces of the teeth; and
        an outer wall portion located immediately above the core back and extending in a circumferential direction;

each of the coil wires includes:
- a plurality of coils into which the coil wire is wound around more than one of the teeth by concentrated winding;
- a connecting wire connecting the coils; and
- a pair of lead wires located at two ends of each of the coil wires and extending from the coils;

the connecting wire of each of the coil wires includes outside-passing portions each extending along an outer surface of the outer wall portion on a radially outer side of the outer wall portion;

the connecting wire of at least one of the coil wires includes an inside-passing portion that extends in a straight line on a radially inner side of the outer wall portion and is connected at two ends of the inside-passing portion to the outside-passing portions; and the inside-passing portion is located on a radially inner side of the lead wires of the other coil wires.

2. The stator according to claim 1, wherein
the outer wall portion includes a hook portion on which the connecting wire is hooked at a boundary between the outside-passing portion and the inside-passing portion.

3. The stator according to claim 2, wherein
an upper end surface of the outer wall portion includes a first region and a second region having different heights, and a step portion connecting the first region and the second region; and
the step portion defines the hook portion.

4. The stator according to claim 2, wherein
an upper end surface of the outer wall portion includes a first protrusion protruding upward; and
the first protrusion defines the hook portion.

5. The stator according to claim 2, wherein
the outer surface of the outer wall portion includes a second protrusion protruding radially outward; and
the second protrusion defines the hook portion.

6. The stator according to claim 1, wherein
the outer surface of the outer wall portion includes a projection projecting radially outward; and
the outside-passing portion is located below the projection.

7. The stator according to claim 1, wherein
the outer wall portion includes a cutout extending downward from an upper end of the outer wall portion;
the cutout includes a bottom surface facing upward; and
the connecting wire is drawn out to an outer side of the outer wall portion through the cutout.

8. A motor comprising:
the stator according to claim 1; and
a rotor that opposes the stator across a gap in a radial direction and is rotatable around the central axis.

9. A method of manufacturing a stator, the method comprising the steps of:
attaching an insulator to a stator core; and
winding a plurality of coil wires each around a plurality of teeth via a connecting wire to form coils; wherein
the stator core includes:
- a core back having an annular shape centering on a central axis extending in a vertical direction; and
- the teeth extending radially inward from the core back;

the insulator includes:
- a plurality of base portions respectively surrounding the teeth; and
- an outer wall portion located immediately above the core back and extending in a circumferential direction;

in the winding the coil wires:
- one of the coil wires to be wound earlier is a first coil wire, and another one of the coil wires to be wound after the first coil wire is a second coil wire;
- after a first end of the first coil wire is drawn out to a radially outer side of the outer wall portion as a lead wire, the first coil wire is wound around the teeth via the connecting wire, and a second end of the first coil wire is drawn out to the radially outer side of the outer wall portion as another lead wire; and
- when the second coil wire is wound around the teeth via the connecting wire, the connecting wire is partly disposed along an outer surface of the outer wall portion on the radially outer side of the outer wall portion, and partly disposed in a straight line on a radially inner side of the outer wall portion in a region radially overlapping with one of the lead wires of the first coil wire.

* * * * *